United States Patent Office 2,743,261
Patented Apr. 24, 1956

2,743,261

COPOLYMER OF α-DIBUTYLPHOSPHONATO-STYRENE AND ACRYLONITRILE

Harry W. Coover, Jr., and Joseph B. Dickey, Kingsport, Tenn., assignors to Eastman Kodak Company, Rochester, N. Y., a corporation of New Jersey No Drawing. Application January 21, 1953,
Serial No. 332,496

1 Claim. (Cl. 260—85.5)

This invention relates to resinous copolymers of α- and β-phosphonato styrenes, and to articles prepared therefrom.

It is known that phosphorus oxide groups when substituted in various organic compounds confer many desirable properties to the organic compounds such as decreased flammability, modified solubility and softening points, and the like. Properties of this kind, especially flame resistance, are highly desirable in synthetic polymers. However, it has been found that most alpha, beta-ethylenically unsaturated phosphonic acid compounds, including the α- and β-phosphonato styrenes, are not homopolymerizable to high molecular weight resinous compounds by the known polymerization processes. It is surprising, therefore, that we have found that α- and β-phosphonato styrenes represented by the following general formulas:

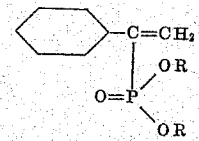

and

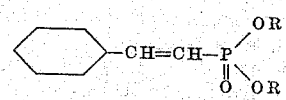

wherein R represents an alkyl group containing from 1 to 4 carbon atoms (e. g. methyl, ethyl, propyl, isopropyl, butyl, sec. butyl, etc. groups), can be readily copolymerized with one or more other monoethylenically unsaturated, polymerizable organic compounds, in certain proportions, by conventional polymerization methods to give high molecular weight, clear, hard resinous copolymers which are moldable into shaped objects, or spinnable into fibers, etc., characterized by being tough and flame resistant.

It is, accordingly, an object of the invention to provide a new class of α- and β-phosphonato styrene copolymers. Another object is to provide shaped articles therefrom which are flame resistant. Another object is to provide a method for preparing such resinous copolymers. Other objects will become apparent hereinafter.

In accordance with the invention, we prepare the new class of α- and β-phosphonato styrene copolymers by copolymerizing 10 to 50 percent by weight of an α- or β-phosphonato styrene defined above with from 90 to 50 percent by weight of one or more polymerizable compounds containing a single ethylenically unsaturated group such as a

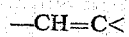

group, but more especially containing a single

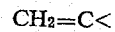

group, for example, by heating at a temperature of from 0° to 150° C., depending on the particular catalyst being used, but preferably from 25° to 100° C., a mixture of the components in the above proportions, in the presence of a polymerization catalyst, preferably a peroxide polymerization catalyst. The copolymers obtained contain the components in approximately the same proportions as in their monomeric starting polymerization mixtures. However, when less than 10 percent by weight of the phosphonato styrene monomer is employed, the copolymer obtained is not sufficiently flame resistant, while mixtures containing more than 50 percent by weight of the phosphonato monomer do not readily copolymerize with the other unsaturated monomer.

Suitable α- and β-phosphonato styrenes for the practice of our invention include α-dimethylphosphonato styrene, α-diethylphosphonato styrene, α-dipropylphosphonato styrene, α-diisopropylphosphonato styrene, α-dibutylphosphonato styrene, α-sec. dibutylphosphonato styrene, α-iso-dibutylphosphonato styrene, α-methylethylphosphonato styrene, α-methylpropylphosphonato styrene, α-methylbutylphosphonato styrene, etc. and the corresponding β-phosphonato styrenes. Suitable other different monoethylenically unsaturated, polymerizable monomers for copolymerization with the above α- and β-phosphonato styrenes include styrene, α-methylstyrene, p-acetaminostyrene, α-acetoxystyrene, isopropenyl acetate, isopropenyl methyl ketone, vinyl esters of carboxylic acids (e. g. vinyl acetate, vinyl propionate, vinyl butyrate, vinyl stearate, vinyl trifluoroacetate, vinyl benzoate, etc.), vinyl alkyl ketones (e. g. methyl vinyl ketone, ethyl vinyl ketone, etc.), vinyl alkyl ethers (e. g. methyl vinyl ether, butyl vinyl ether, etc.), vinyl sulfonamides (e. g. vinyl sulfonamide, N-methyl vinyl sulfonamide, etc.), vinyl halides (e. g. vinyl chloride, vinyl bromide, vinyl fluoride), vinylidene halides (e. g. vinylidene dichloride, vinylidene difluoride, vinylidene chloride-bromide, etc.), vinyl urethanes (e. g. vinyl methyl urethane, vinyl ethyl urethane, etc.), cyclic vinyl imides (e. g. vinyl succinimide, vinyl phthalimide, etc.), acrylic acid and its derivatives (e. g. acrylamide, N-alkyl acrylamides, acrylonitrile, alkyl esters such as methyl, ethyl, propyl, butyl, benzyl, phenyl acrylates, etc.) and methacrylic acid and its corresponding amides, nitrile, esters, etc., alkyl maleates and fumarates (e. g. dimethyl maleate, diethyl fumarate, etc.), fumaronitrile, ethylene, isobutylene, and the like. Mixtures of one or more of the phosphonato styrenes of the invention can be copolymerized with the above different monoethylenically unsaturated, polymerizable compounds.

The copolymerizations according to the invention can be carried in mass, in solution, in suspension or emulsion in aqueous or other suitable diluents. Advantageously, a polymerization catalyst is employed to accelerate the copolymerization. Peroxide catalysts are preferred, e. g. organic peroxides such as benzoyl peroxide, acetyl peroxide, lauroyl peroxide, tertiary butyl hydroperoxide, hydrogen peroxide, persulfates such as sodium persulfate, potassium persulfate, ammonium persulfate, persulfuric acid, etc., perborates such as sodium perborate, potassium perborate, the water-soluble salts of percarbonic acid, the water-soluble salts of perphosphoric acid, the water-soluble salts of sulfo-peracids, etc. Boron trifluoride is also an effective polymerization catalyst. Mixtures of the catalysts can be employed. The amount of catalyst can advantageously be from 0.1 to 1% by weight or even more, based on the weight of the monomers to be polymerized.

For emulsion copolymerizations any non-solvent for the mixture of monomers can be employed, water being especially advantageous. The mixture of monomers can be advantageously emulsified in water using an emulsifying agent such as a salt of a higher fatty acid, e. g.

sodium or potassium stearate, palmitate, etc., an ordinary soap, a salt of a higher fatty alcohol sulfate, e. g. sodium or potassium lauryl sulfate, sodium or potassium di(2-ethylhexyl)sulphosuccinate, sodium or potassium cetyl sulfate, sodium or potassium stearyl sulfate, etc., a salt of an aromatic sulfonic acid, e. g. sodium or potassium salt of an alkyl naphthalene sulfonic acid, etc., a higher molecular weight quaternary ammonium salt containing the radical $C_{14}H_{31}$ or the radical $C_{17}H_{35}$, etc. Mixtures of emulsifying agents can be employed. For bead or granular copolymerizations, relatively poor dispersing agents such as starch, methylated starch, gum arabic, polyvinyl alcohol, partially hydrolyzed polyvinyl acetate, gelatin, sodium glycolate, etc. can be employed. Mixtures of these dispersing agents can also be used. In the copolymerizations, wherein the mixture of monomers is dispersed in a non-solvent, the dispersion and polymerization can be facilitated by stirring, shaking or tumbling the reaction mixture. Advantageously, an activating agent such as sodium bisulfite, potassium bisulfite, sodium hydrosulfite, sulfinic acid, etc. can be used in conjunction with the peroxide catalyst. Also chain regulators such as a mercaptan, e. g. hexyl, octyl, lauryl, dodecyl mercaptans, etc., can also be added with advantage to the polymerization mixtures.

The following examples will serve to illustrate further our new α- and β-phosphonato styrene polymers and the manner of preparing the same.

Example 1

A mixture of 9 g. of styrene, 1 g. of α-diethylphosphonato styrene and 0.1 g. of acetyl peroxide was copolymerized at 60° C. in an atmosphere of nitrogen. The product was a clear, moldable copolymer containing approximately 10 percent by weight of α-diethylphosphonato styrene and the remainder of styrene. It had a softening point of 90° C. and was soluble in chlorobenzene.

In place of styrene in the above example, there can be substituted a like amount of α-methyl styrene to give the corresponding copolymer. Also the α-diethylphosphonato styrene can be replaced in the above example with a like amount of any one of the mentioned α- and β-phosphonato styrenes of the invention.

Example 2

A mixture of 8 g. of methyl methacrylate, 2 g. of β-dimethylphosphonato styrene and 0.2 g. of benzoyl peroxide was copolymerized at 80° C. in an atmosphere of nitrogen. The product was a clear, moldable polymer containing approximately 20 percent by weight of α-dimethylphosphonato styrene and approximately 80° percent by weight of methyl methacrylate. It had a softening point of 95° C. and was soluble in acetone.

In place of the methyl methacrylate in the above example, there can be substituted a like amount of other methacrylates or acrylates such as ethyl methacrylate, butyl methacrylate, methyl acrylate, ethyl acrylate, butyl acrylate, etc. to give the corresponding copolymers with β-dimethylphosphonato styrene.

Example 3

7 g. of acrylonitrile, 3 g. of α-dibutylphosphonato styrene, 0.1 g. of ammonium persulfate, 0.1 g. of sodium bisulfite and 0.5 g. of potassium laurate were added to 100 cc. of distilled water. Polymerization was completed by heating at 35° C. for a period of 16 hours. The resultant polymer contained by weight approximately 30 percent of a α-dibutylphosphonato styrene and 70 percent of acrylonitrile, and was soluble in dimethylacetamide and in acetonitrile. It had a softening point of 195° C. and gave on spinning from its solutions flexible and noninflammable fibers.

In place of the acrylonitrile in the above example, there can be substituted a like amount of methacrylonitrile to give the corresponding copolymer having generally similar properties and utility. Also, in place of the α-dibutylphosphonato styrene in the above example, there can be substituted a like amount of any one of the other of the mentioned α- and β-phosphonato styrenes, more specifically α-dimethylphosphonato styrene, α-diethylphosphonato styrene, α-dipropylphosphonato styrene, β-dimethylphosphonato styrene, β-diethylphosphonato styrene, β-dipropylphosphonato styrene, β-di-isopropylphosphonato styrene, β-dibutylphosphonato styrene, β-sec. dibutylphosphonato styrene, and the like, to give the corresponding copolymers with acrylonitrile or with methacrylonitrile.

Example 4

10 g. of vinyl chloride and 5 g. of β-di-isopropylphosphonato styrene were emulsified in 50 cc. of water using 0.5 g. of polyvinyl alcohol as an emulsifying agent and polymerized at 60°–70° C., using ammonium persulfate as a polymerization catalyst. After about 24 hours, acetic acid was added and the white precipitated polymer was filtered, washed and dried. It contained approximately 33 percent by weight of β-di-isopropylphosphonato styrene, the remainder being vinyl chloride, and had a softening point of 75° C. The polymer was soluble in cyclohexanone.

By proceeding as set forth in the above examples, other generally similar copolymers can be prepared by employing starting polymerization mixtures containing 15%, 25%, 40% or 50% by weight of one or more of the α- and β-phosphonato styrenes of the invention, the remainder of the monomers being one or more of the other mentioned polymerizable, unsaturated compounds.

All of the copolymers of the invention can be dissolved in one or more volatile solvents such as acetone, acrylonitrile, cyclohexanone, dimethyl acetamide, dimethyl formamide, γ-butyrolactone, N-methyl-2-pyrrolidone, ethylene carbonate, malononitrile, ethylene cyanohydrin, dimethyl sulfone, dimethyl cyanamide, N,N-dimethyl methoxyacetamide, dimethyl sulfoxide, N-formyl pyrrolidone, tetramethylene sulfoxide, N-formyl morpholine, N,-N'-tetramethylene methanephosphondiamide, and the like. The solution or dopes of the copolymers of the invention can be extruded to form filaments as with the acrylonitrile copolymers, coated to continuous sheets, photographic film supports, etc., or applied as impregnating agents to paper and textile or fibrous materials. Some of the copolymers are moldable to give flame resistant shaped articles. All of the compositions whether designed for use in the form of their solutions or dopes or in the form of solid molding compositions can have incorporated in such compositions suitable plasticizers, fillers, coloring matter, and the like.

What we claim is:

A resinous copolymer consisting of about 30% by weight of α-dibutylphosphonato styrene and about 70% by weight acrylonitrile, said copolymer being soluble in dimethylacetamide and in acetonitrile and having a softening point of about 195° C.

References Cited in the file of this patent

UNITED STATES PATENTS

| | | |
|---|---|---|
| 2,439,214 | Lindsey | Apr. 6, 1948 |
| 2,485,677 | Toy | Oct. 25, 1949 |
| 2,497,638 | Toy | Feb. 14, 1950 |
| 2,497,920 | Woodstock | Feb. 21, 1950 |

OTHER REFERENCES

Marvel: J. Polymer Sci., VIII, page 256 (Feb. 1952; received November 2, 1951).